United States Patent [19]

Komai et al.

[11] 4,238,381

[45] Dec. 9, 1980

[54] PROCESS FOR PRODUCING A NON-AQUEOUS SYSTEM DISPERSED SOLUTION OF POLYMERS FROM POLYMERIC PEROXIDES

[75] Inventors: Takeshi Komai; Masaru Matsushima, both of Aichi, Japan

[73] Assignee: Nippon Oil and Fats Co., Ltd., Tokyo, Japan

[21] Appl. No.: 54,239

[22] Filed: Jul. 2, 1979

[30] Foreign Application Priority Data

Jul. 4, 1978 [JP] Japan .................................. 53-80584

[51] Int. Cl.$^3$ ............................................ C08L 33/08
[52] U.S. Cl. .......................... 260/31.2 R; 260/31.2 N; 260/32.8 R; 260/32.8 N; 260/33.4 R; 260/33.6 R; 525/419; 525/451
[58] Field of Search ...................... 260/31.2 R, 31.2 N, 260/32.8 R, 32.8 N, 33.4 R, 33.6 R; 525/419, 451

[56] References Cited

U.S. PATENT DOCUMENTS

| | | | |
|---|---|---|---|
| 3,257,340 | 6/1966 | Osmond ................................ | 525/285 |
| 3,365,414 | 1/1968 | Fisk et al. ............................. | 525/519 |
| 3,468,826 | 9/1969 | McWhorter et al. ................. | 525/451 |
| 3,514,500 | 5/1970 | Osmond et al. ...................... | 260/33.6 R |
| 4,049,611 | 9/1977 | Hirzy .................................... | 525/451 |

FOREIGN PATENT DOCUMENTS 49-5194 of 1974 Japan .
50-126093 of 1975 Japan .

OTHER PUBLICATIONS

*Chem. Abs.*, 83: 115408v, 1975.

*Primary Examiner*—Maurice J. Welsh
*Attorney, Agent, or Firm*—Blanchard, Flynn, Thiel, Boutell & Tanis

[57] ABSTRACT

A non-aqueous liquid dispersion of polymers is obtained by a first step of copolymerizing one or more vinyl-type monomers with one or more polymerized peroxides, capable of further polymerization followed by a second step of copolymerizing the resulting copolymer having peroxy bonds therein with one or more vinyl-type monomers different than the one or ones used in the first copolymerization step, in an organic liquid which dissolves the polymers of the vinyl-type monomers of the first copolymerization but does not dissolve the polymers of the vinyl-type monomers used in the second copolymerization. The dispersion is splendid in dispersion stability and it is very useful as a thermosetting, film-type, coating composition.

4 Claims, No Drawings

PROCESS FOR PRODUCING A NON-AQUEOUS SYSTEM DISPERSED SOLUTION OF POLYMERS FROM POLYMERIC PEROXIDES

BACKGROUND OF THE INVENTION

FIELD OF THE INVENTION

This invention relates to a non-aqueous liquid system comprising a dispersion of polymers in a non-aqueous liquid.

A non-aqueous liquid dispersion of polymers is useful as a paint, ink, adhesive and the like, and it has advantages in that the amount of solvent used in the paint can be reduced and it can be a photochemically non-active solvent.

One of the known methods for producing a non-aqueous system liquid dispersion of polymers comprises subjecting vinyl-type monomers, the polymers of which are insoluble in an organic liquid, to graft polymerization in the presence of a dispersion stabilizer which is soluble in said organic liquid. Many methods are known which employ many combinations of a dispersion stabilizer and a vinyl-type monomer.

For example, as a dispersion stabilizer, there are mentioned a decomposed rubber in U.S. Pat. No. 3,257,340, butylated melamine—formaldehyde resin in U.S. Pat. No. 3,365,414, self-condensates of 12—hydroxy stearate—glycidyl methacrylate—methyl methacrylate—copolymer in U.S. Pat. No. 3,514,500, and glycidyl methacrylate-alkyl methacrylate-acrylic acid—copolymer (Japanese Laid-Open Publication No. SHO50-126093 (1975)).

These methods have faults in that the processes not only are complicated, but also, because the polymerization yield thereof in the graft polymerization process is low, the reaction time thereof is long and the productivity is low and the dispersion stability of the liquid dispersion is bad (the duration of stable storage is about one month).

As another method for producing a non-aqueous system comprising a liquid dispersion of polymers, Japanese Patent Laid-Open Publication No. SHO49-5194 (1974) proposes to produce the same by a process comprising carrying out a two-step polymerization in an organic liquid, using peroxyester-type peroxides having two peroxy bonds whose decomposition temperatures are different from each other, wherein the first step comprises polymerizing a vinyl-type monomer or mixture thereof in the organic liquid at a temperature corresponding to the lower decomposition temperature of the peroxide, thereby obtaining a polymer which is soluble in the organic liquid, and the second step comprises subjecting the product of the first step and another vinyl-type monomer to graft polymerization, at a temperature corresponding to the higher decomposition temperature of the peroxide thereby to obtain a polymer which is insoluble in the organic liquid.

This method has faults in that about half of the polymers produced by the first step are polymers which do not take part in the second step, because the peroxides used are the peroxyester type peroxide having two peroxy bonds. Accordingly the graft efficiency is low and the resulting liquid dispersion is poor in dispersion stability.

SUMMARY OF THE INVENTION

An object of the present invention is to provide a method for producing a non-aqueous liquid dispersion of polymers which possesses splendid dispersion stability and is very useful as a coating composition.

Another object of the present invention is to provide a method for producing a non-aqueous liquid dispersion of polymers which employs simple procedural steps and in which the graft polymerization efficiency is high.

A still further object of the present invention is to provide a non-aqueous liquid dispersion of polymers which is useful as a thermosetting, film-forming, coating, polymer composition, and the film obtained from the dispersion possesses excellent smoothness and exhibits good performances.

The present invention is based on the discovery that, heretofore, the dispersion stability of the liquid dispersion depends on the kind of vinyl-type polymer or polymers which is made into the insoluble polymer or polymers of the liquid dispersion, and especially when vinyl-type monomers are used which are made into soft polymers which are of low polarity the resulting liquid dispersion is poor in dispersion stability and there occurs the phenomonon of gel formation or precipitation of the particles during storage. For achieving good stability of the liquid dispersion, it is necessary to use a large amount of vinyl-type monomer which is made into a hard polymer which is of high polarity. Accordingly, the glass transition point of the polymer (hereinafter designated as Tg) must exceed 50° C. for obtaining good dispersion stability of the liquid dispersion.

The present invention is based on the second discovery that when a non-aqueous liquid dispersion of polymers is obtained by a first step of copolymerizing vinyl-type monomers with a polymerized peroxide which is capable of further polymerization to obtain the polymer product of the first step copolymerization, followed by a second step of copolymerizing the polymer product obtained in the first copolymerization step with vinyl-type monomer which is different in composition from the vinyl-type monomer used in the first copolymerization step, in an organic liquid which can dissolve the polymers of the vinyl-type monomers of the first copolymerization step but does not dissolve the polymers of the vinyl-type monomers used in the second copolymerization step, if the polymer product obtained by the first copolymerization step has peroxy bonds therein which act as polymerization initiators in the second copolymerization step, there is obtained a very high yield of block copolymers in the second copolymerization step and these block copolymers are effective for achieving a high dispersion stability of the liquid dispersion and because the copolymerization reaction can be applied stably, the particles of the polymers do not form gels and aggregates and that, therefore, in the non-aqueous liquid dispersion of the polymers, there is no danger of a rapid increase of the viscosity thereof.

The present invention is based on the third discovery that when vinyl-type monomers, whose polymers have Tg values of from plus 50° C. to minus 85° C., are used in the second copolymerization, the insoluble polymers in the obtained block copolymers are made soft and can remain dispersed for a long time. Also, the particles of the block copolymers can be made into a uniform coating film which are continuously distributed, because they are splendid in melting fluidity.

The Tg values of copolymers of one or more vinyl-type monomers were calculated according to Fox's formula, calculated on the assumption that said copolymer consists of homopolymer units of the respective vinyl-type monomers.

Fox's formula is shown in the following $$\frac{1}{Tg_o} = \frac{w_1}{Tg_1} + \frac{w_2}{Tg_2} + \ldots + \frac{w_n}{Tg_n}$$

wherein
- $w_1$ is ratio by weight of monomer 1 to the total weight of the copolymer
- $w_2$ is ratio by weight of monomer 2 to the total weight of the copolymer
- $w_n$ is ratio by weight of monomer n to the total weight of the copolymer
- $Tg_1$ is the Tg value for a homopolymer of monomer 1 (°K.)
- $Tg_2$ is the Tg value for a homopolymer of monomer 2 (°K.)
- $Tg_n$ is the Tg value for homopolymer of monomer n (°K.)
- $Tg_o$ is the Tg value for the copolymer of monomers 1 to n.

In connection with the non-aqueous liquid dispersion of polymers, the respective Tg values of homopolymers of vinyl-type monomers which constitute the insoluble part of the polymers in the liquid dispersion are shown in Table 1.

TABLE 1

| Monomer | Tg (°C.) of homopolymer estimated value | Monomer | Tg (°C.) of homopolymer estimated value |
|---|---|---|---|
| Methyl acrylate | 8 | Cyclohexyl methacrylate | 66 |
| Ethyl acrylate | −22 | Lauryl methacrylate | −65 |
| Isopropyl acrylate | −5 | Phenyl methacrylate | 110 |
| n-Butyl acrylate | −54 | Hydroxyethyl methacrylate | 55 |
| t-Butyl acrylate | 41 | Hydroxypropyl methacrylate | 26 |
| 2-ethylhexyl acrylate | −85 | Glycidyl methacrylate | 41 |
| Cyclohexyl acrylate | 15 | Acrylic acid | 106 |
| Hydroxyethyl acrylate | −15 | Methacrylic acid | 130 |
| Hydroxypropyl acrylate | −7 | Maleic acid | 130 |
| Methyl methacrylate | 105 | Acrylamide | 153 |
| Ethyl methacrylate | 65 | Diacetone acrylamide | 65 |
| Isopropyl methacrylate | 81 | Styrene | 100 |
| n-Butyl methacrylate | 20 | Vinyl acetate | 30 |
| Isobutyl methacrylate | 67 | Acrylonitrile | 100 |
| n-Hexyl methacrylate | −5 | Vinyl chloride | 82 |

The non-aqueous liquid dispersion of polymers, according to the present invention, is prepared by copolymerizing (a) one or more polymeric peroxides selected from a group consisting of the compounds having the following general formulas (I) and (II), with (b) one or more vinyl-type monomers (first copolymerization), thereby obtaining copolymers having peroxy bonds therein, and subjecting the resulting copolymers having peroxy bonds therein to block copolymerization (second copolymerization), with (c) one or more vinyl-type monomers which are different in composition from the first-mentioned vinyl-type monomers (a), the copolymerizations being carried out in an organic liquid which dissolves the polymers of the vinyl-type monomers (a) used to make the copolymer having peroxy bonds therein (polymer product of the first copolymerization), but which do not dissolve the polymers of the other vinyl-type monomers (c) which are copolymerized with the copolymers having peroxy bonds therein.

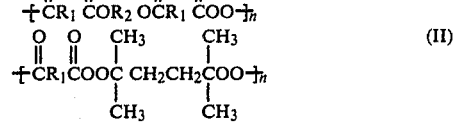

wherein $R_1$ is an alkylene group having 1 to 18 carbon atoms or a phenylene group, and $R_2$ are (1) an alkylene group having 2 to 10 carbon atoms, (2) a group of the formula

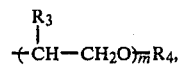

wherein $R_3$ is hydrogen or methyl, $R_4$ is an alkylene group having 2 to 10 carbon atoms and m is an integer of 1 to 13,

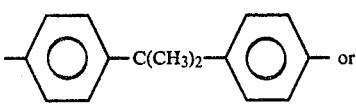

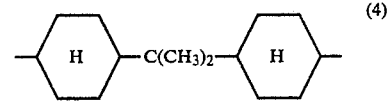

and n=2 to 20.

Illustrative typical polymeric peroxides of the general formula (I) are the following:

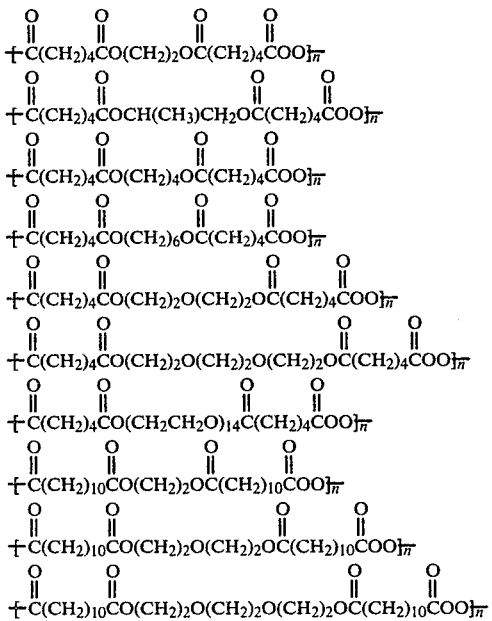

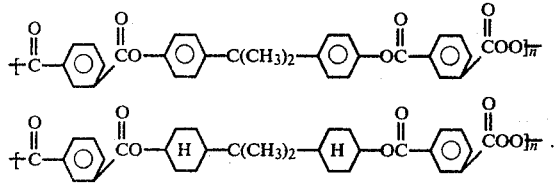

(n=2 to 20)

As the polymeric peroxides of the general formula (II), there are mentioned for example, compounds having the following formulas.

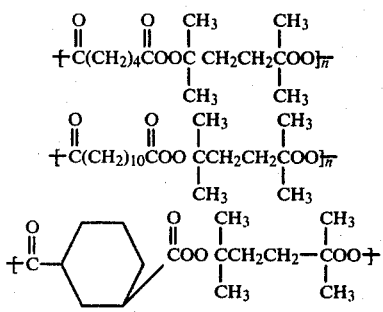

(n=2 to 20)

As the organic liquid employed in the present invention, there are mentioned aliphatic hydrocarbons such as n-hexane, n-heptane and n-octane, a mixture of hydrocarbons having a boiling point of 80° to 300° C. such as petroleum benzine, ligroin, mineral spirit, petroleum naphtha and kerosine, cycloaliphatic hydrocarbons such as cyclohexane and methylcyclohexane, aromatic hydrocarbons such as toluene and xylene, esters such as ethyl acetate and butyl acetate, ketones such as methylethyl ketone, methyl isobutyl ketone and cyclohexanone, and alcohols such as ethyl alcohol, isopropyl alcohol and octyl alcohol. The organic liquid of the invention can be used alone for the copolymerization or it can be used in conjunction with other organic inert liquids.

Vinyl-type monomers heretofore described include, for example, butadiene, styrene, vinyl acetate, vinyl propionate, vinyl stearate, vinyl chloride, vinylidene chloride, acrylonitrile, methyl methacrylate, ethyl methacrylate, n-propyl methacrylate, isopropyl methacrylate, butyl methacrylate, tert-butyl methacrylate, n-hexyl methacrylate, cyclohexyl methacrylate, octyl methacrylate, benzyl methacrylate, 2-ethylhexyl methacrylate, lauryl methacrylate, stearyl methacrylate hydroxyethyl methacrylate, hydroxypropyl methacrylate, glycidyl methacrylate, glycidyl methallylether, methacrylamide, N-methylol methacrylamide, N-methoxymethyl methacrylate, methacrylic acid, itaconic acid, crotonic acid, fumaric acid, maleic acid, dibutyl fumarate, maleic anhydride, and dodecyl succinic anhydride and all acrylic compounds corresponding to the aforementioned methacrylic compounds.

The vinyl-type monomer can be used alone for the copolymerization, or it can be used in conjunction with other monomers.

The organic liquid is chosen in conjunction with the vinyl-type monomers so as to satisfy the conditions that the said organic liquid dissolves (1) polymers of the vinyl-type monomers obtained in the first copolymerization which are copolymers having peroxy bonds therein, but (2) do not dissolve polymers of the other vinyl-type monomers employed in the second copolymerization for copolymerization with the said copolymers having peroxy bonds therein.

The organic liquid can be used alone for the copolymerization or it can be used in conjunction with other inert organic liquids.

Illustrative combinations of an organic liquid and vinyl-type monomers are the following.

When there are used copolymers having peroxy bonds therein obtained in the first copolymerization step from first vinyl-type monomers consisting mainly of higher alkyl esters for example, such as n-butyl methacrylate, 2-ethylhexyl methacrylate, lauryl methacrylate, octyl methacrylate, stearyl methacrylate, and when there are used in the second copolymerization polymerization step vinyl-type monomers to be copolymerized with said copolymers having peroxy bonds therein, for example, such as lower alkyl esters of methacrylic acid such as methyl methacrylate, ethyl methacrylate, n-propyl methacrylate, and styrene or vinyl toluene, then aliphatic hydrocarbons such as n-hexane, n-octane, and mixed hydrocarbons such as petroleum naphtha and mineral spirit are preferred for use of the organic liquid.

When the copolymer having peroxy bonds therein is prepared in the first copolymerization step from first vinyl-type monomers consisting mainly of lower and/or higher alkyl esters of acrylic acid or methacrylic acid, styrene or butadiene, and when for the other vinyl-type monomers to be copolymerized with said first step copolymer in the second copolymerization, there are used acrylonitrile, vinyl chloride and vinylidene chloride, then for the organic liquids aromatic hydrocarbons such as toluene and xylene, and/or esters such as ethyl acetate and butyl acetate are suitable.

Also, when as the copolymers having peroxy bonds therein, there are used copolymers prepared in the first copolymerization from first vinyl-type monomers consisting mainly of methacrylic acid, hydroxyethyl methacrylate or hydroxypropyl methacrylate, and when for the other vinyl-type monomer to be copolymerized with said copolymers having peroxy bonds therein in the second copolymerization, there are used higher alkyl esters such as n-butyl methacrylate, 2-ethylhexyl methacrylate, lauryl methacrylate, stearyl methacrylate and the like, styrene, or butadiene, then alcohols such as ethyl alcohol and isopropanol are preferred organic liquids.

The copolymers having peroxy bonds therein obtained in the first copolymerization polymerization step of the present invention can be obtained by employing vinyl-type monomers in known bulk polymerization, suspension polymerization or solution polymerization procedures.

The amount used of the polymeric peroxide can preferably range from 0.5 to 10 parts by weight based on 100 parts by weight of said vinyl-type monomers used in the first polymerization step.

The polymerization temperature in the first copolymerization can range preferably from 60° to 80° C. The polymerization time is preferably in the range of 2 to 5 hours.

The polymeric peroxides of the present invention can be used singly for the first copolymerization polymerization, or they can be used in conjunction with other polymeric peroxides.

In carrying out the present invention, when solid copolymers having peroxy bonds therein are obtained by bulk polymerization or suspension polymerization methods, the resulting polymer products are dissolved in a mixed solution of the organic liquid and the vinyl-type monomers to be copolymerized in the second copolymerization, followed by performing the block copolymerization (second copolymerization) whereby the desired product, i.e. the non-aqueous liquid dispersion, is obtained.

When the copolymers having peroxy bonds therein are obtained by solution polymerization method in which the organic liquid is used as the solvent, the copolymer obtained in the first copolymerization is subjected to block copolymerization with the other vinyl-type monomer in the said solution as it is, in the second copolymerization whereby the desired non-aqueous liquid dispersion of polymers is obtained.

The preferred polymerization temperature for the block copolymerization (second copolymerization) reaction is 60° to 90° C. The polymerization time is preferably from 3 to 6 hours. The amount used of the organic liquid is preferably in the range of 70 to 30% by weight, based on the total weight of the non-aqueous liquid dispersion of polymers (final product).

The ratio of the amount of the soluble part of the block copolymers to the amount of the insoluble part of the block copolymers is not absolutely critical, but it is usually in the range of 2/1 to 1/10, preferably in the range of 1/1 to 1/10.

According to the present invention, the desired non-aqueous liquid dispersion of polymers can be obtained by a relatively simple and easy procedure.

The non-aqueous liquid dispersion of polymers is useful as a coating composition and if necessary, it can be mixed with other resins, pigments, fillers and many kinds of conventional additives for the coating procedures.

As the resins which can be added into the non-aqueous liquid dispersion of polymers of the present invention, there are mentioned, melamine resin, epoxy resin, vinyl resin and the like. These resins include, for example, butylated-melamine-formaldehyde-resin, butylated-benzoguanamine-formaldehyde-resin, butylatedurea-formaldehyde-resin, block isocyanate resin, polyepoxide resin and polyamide resin of aromatic-, aliphatic- or cycloaliphatic series compounds, and vinyl resins having hydroxyl groups, isocyanate groups or alkoxy methylolated amide groups. Because they have a supplementary functional group, in addition to the functional groups of the non-aqueous liquid dispersion of polymers, they are suitable for use in thermosetting film-type, coating, polymer compositions.

The cured coating film obtained from the non-aqueous liquid dispersion of polymers of the invention exhibits excellent smoothness and good film-forming properties.

PREFERRED EMBODIMENTS OF THE INVENTION

The term "part" shall mean parts by weight hereinafter.

EXAMPLE 1.

(A-1): Preparation of a copolymer having peroxy bonds therein

A mixed solution consisting of 35 parts of stearyl methacrylate, 2.5 parts of

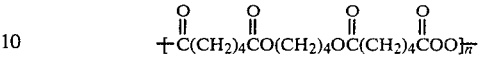

($n \approx 5.5$) and 50 parts of ethyl acetate was charged into a reaction vessel which was provided with a thermometer, a stirrer and a reflux condenser. The mixed solution was heated at 75° C. while introducing nitrogen gas therein and was subjected to a polymerization reaction for 3 hours.

The resulting product contained 42.5 wt.% of copolymer having peroxy bonds therein and it was a transparent liquid whose viscosity at 25° C. was 0.5 poise.

This obtained product is designated as (A-1) product hereinafter.

(B-1): Preparation of a non-aqueous liquid dispersion of polymers 100 parts of mineral spirit was charged into a reaction vessel which was provided with a thermometer, a stirrer and a reflux condenser, the contents of the reaction vessel was heated at 80° C., and nitrogen gas was introduced therein. A mixed solution having the following composition, in parts by weight,

| (A-1) product | 90 |
| --- | --- |
| Methyl methacrylate | 67 |
| Ethyl acrylate | 29 |
| Hydroxypropyl methacrylate | 10 |
| Methacrylic acid | 4 | was charged into the reaction vessel over a period of 1.5 hours.

The contents of the reaction vessel were subjected to polymerization at 80° C. for 4 hours, while introducing nitrogen gas therein, thereby to obtain a milky white liquid dispersion of polymers.

This dispersion contained about 50.5 wt. % of block copolymers and its viscosity was 5.5 poise at 25° C.

The dispersion was allowed to stand for six months. It was so stable that the particles therein did not precipitate and it did not separate into two phases, and the viscosity thereof did not change.

The Tg value for the insoluble part of the block copolymer was about 54° C., according to Fox's formula.

The obtained dispersion was coated onto a mild steel plate to obtain a dried coating film of 50$\mu$ in thickness, following which it was heated at 70° C., whereby the obtained film was very lustrous and smooth.

EXAMPLE 2

(A-2): Preparation of a copolymer having peroxy bonds therein

A mixed solution consisting of 35 parts of 2-ethylhexyl methacrylate, 2.8 parts of

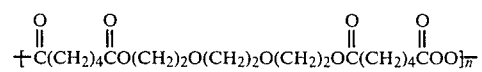

($n \approx 5.8$) and 50 parts of butyl acetate was subjected to polymerization at 75° C. for 3 hours according to the same procedure as described in Example 1. The obtained product (A-2 product) contained 42.5 wt. % of copolymer having peroxy bonds their and it was a transparent liquid whose viscosity at 25° C. was 5 poise.

(B-2): Preparation of a non-aqueous liquid dispersion of polymers

According to the same procedures as those described in Example 1, a mixed solution having the following composition of

|  | parts by weight |
|---|---|
| Aliphatic hydrocarbon (Production of Shell Co., Ltd. Trademark: Shellsol 71 Fraction of bp 173-195° C. | 100 |
| (A-2) product | 90 |
| Methyl methacrylate | 60 |
| Styrene | 33 |
| Hydroxyethyl methacrylate | 15 |
| Acrylic acid | 2 | was dropped into the reaction vessel and further it was kept at 80° C. for 3 hours, whereby to obtain a milky white liquid dispersion of polymers whose viscosity was 4.0 poise at 25° C. and which contained 51.1 wt. % of block copolymers.

The liquid dispersion was so stable that after it was allowed to stand for six months, neither appreciable precipitation of the particles therein, nor appreciable separating thereof into two layers, nor change of viscosity thereof were observed.

The Tg value for the insoluble part of the block copolymer was calculated to be 98° C. according to Fox's formula.

The obtained non-aqueous liquid dispersion was applied onto a mild steel plate to obtain a dried coating film of 50μ in thickness, followed by further heating at 70° C., whereby the obtained film was very lustrous and smooth.

EXAMPLE 3

(A-3): Preparation of a copolymer having peroxy bonds therein

According to the same procedures as described in Example 1, a mixed solution having the following composition of

|  | parts by weight |
|---|---|
| Hydroxyethyl methacrylate | 30 |
| Methyl methacrylate | 18 |
| Acrylic acid | 2 |
| $+C(CH_2)_4CO(CH_2)_2O(CH_2)_2O(CH_2)_2OC(CH_2)_4COO+_n$ ($n \approx 5.8$) | 3.5 |
| Isopropyl alcohol | 30 |
| Ethylcellosolve | 20 | was subjected to polymerization for 3 hours, while introducing nitrogen gas therein. The obtained product (A-3 product) contained 50.8 wt. % of copolymer having peroxy bonds therein and it was a transparent liquid whose viscosity at 25° C. was 7.5 poise.

(B-3): Preparation of a non-aqueous liquid dispersion of polymers

According to the same procedure as described in Example 1, 175 parts of isopropyl alcohol were heated at 80° C. in a reaction vessel while introducing nitrogen gas therein and a mixed solution of (A-3) product and 100 parts of acrylamide was dropped into the reaction vessel at 80° C. over a period of 3 hours.

The resulting mixture was subjected to polymerization at 80° C. for 3 hours, thereby obtaining a milky white liquid dispersion of polymers. The obtained liquid dispersion contained about 40.5 wt. % of the block copolymer and its viscosity at 25° C. was 3.2 poise.

The liquid dispersion was so stable that after it was allowed to stand for six months, neither appreciable precipitation of the particles therein, nor appreciable separation thereof into two layers, nor change of the viscosity thereof were observed.

The Tg value for the insoluble part of the block copolymer was 153° C. from Table 1.

The obtained liquid dispersion was applied onto a mild steel plate to obtain a dried coating film of 50μ in thickness, which was further heated at 70° C., whereby the obtained film was very lustrous and smooth.

EXAMPLE 4

(A-4): Preparation of a copolymer having peroxy bonds therein

A mixed solution having the following composition of

|  | Parts by weight |
|---|---|
| Methyl methacrylate | 14 |
| n-Butyl acrylate | 14 |
| Hydroxyethyl methacrylate | 7 |
| $+C(CH_2)_4CO(CH_2)_2O(CH_2)_2O(CH_2)_2OC(CH_2)_4COO+_n$ ($n \approx 5.8$) | 3 |
| Toluene | 35 |
| Methylisobutyl ketone | 15 | was subjected to polymerization at 75° C. according to the same procedure as described in Example 1. The obtained product (A-4 product) contained 42.7 wt. % of copolymer having peroxy bonds therein and it was a transparent liquid whose viscosity at 25° C. was 0.5 poise.

(B-4): Preparation of a non-aqueous liquid dispersion of polymers 50 parts of toluene and 50 parts of methylisobutyl ketone were charged in an autoclave which was equipped with a thermometer and a stirrer and after the autoclave was closed, the ambient atmosphere therein was replaced with nitrogen gas.

The resulting mixture was heated to 80° C., and then a mixture of 90 parts of (A-4) product, 90 parts of vinyl chloride and 20 parts of vinyl acetate was added dropwise over a period of two hours.

The contents of the autoclave were kept at 80° C. for 3 hours, whereby a milky liquid dispersion which contained 50.4 wt. % of the block copolymer and whose viscosity at 25° C. was 5.0 poise, was obtained.

The resulting liquid dispersion was so stable that after it was allowed to stand for 6 months, no appreciable precipitation of the particles therein, no appreciable separation thereof into two layers, and no change of the viscosity thereof were observed.

The Tg value for the insoluble part of the block copolymer was calculated to be 70° C., according to Fox's formula.

The obtained liquid dispersion was applied onto a mild steel plate to obtain a dried coating film of 50μ in thickness, followed by further heating at 70° C., whereby the obtained film was very lustrous and smooth.

EXAMPLE 5

(A-5): Preparation of copolymer having peroxy bonds therein

A mixed solution consisting of 35 parts of n-butyl acrylate, 2.5 parts of $$+C(CH_2)_4\overset{O}{\overset{\|}{C}}O(CH_2)_4O\overset{O}{\overset{\|}{C}}(CH_2)_4COO+_n$$

and 50 parts of methylethyl ketone was subjected to polymerization at 75° C. for 3 hours according to the same procedure as described in Example 1. The obtained product (A-5 product) contained 42.5 wt. % of copolymer having peroxy bonds therein and it was a transparent liquid whose viscosity at 25° C. was 0.3 poise.

(B-5): Preparation of a non-aqueous liquid dispersion of polymers 100 parts of mineral spirit were heated in the reaction vessel at 80° C., while introducing nitrogen gas therein, and then a mixed solution of 90 parts of (A-5) product and 110 parts of vinyl acetate was further charged into the reaction vessel over a period of two hours.

The contents of the reaction vessel were subjected to polymerization at 80° C. for 4 hours, while introducing nitrogen gas therein, thereby obtaining a milky liquid dispersion of the polymers which contained about 50.5 wt. % of the block copolymer and whose viscosity at 25° C. was 4.1 poise.

The liquid dispersion was so stable that after it was allowed to stand for 6 months, neither appreciable precipitation of the particles therein, nor appreciable separation thereof into two layers, nor change of viscosity thereof were observed.

The Tg value for the insoluble part of the block copolymer was calculated to be 30° C. from Table 1. The obtained liquid dispersion was applied onto a sheet of paper and the organic solvent thereof was evaporated, whereby an adhesive resin layer was formed on the surface of the paper. It was recognized that the liquid dispersion would be useful as an adhesive agent.

EXAMPLE 6

(A-6): Preparation of copolymer having peroxy bonds therein

A mixed solution having the following composition of

| | Parts by weight |
|---|---|
| 2-Ethylhexyl methacrylate | 35 |
| $+C(CH_2)_4\overset{O}{\overset{\|}{C}}O(CH_2)_2O(CH_2)_2O(CH_2)_2O\overset{O}{\overset{\|}{C}}(CH_2)_4COO+_n$ (n ≈ 5.8) | 2.5 |
| Ethyl acetate | 50 | was subjected to polymerization at 75° C. for 3 hours according to the same procedure as described in Example 1. The obtained product (A-6 product) contained 42.5 wt. % of copolymer having peroxy bonds therein. It was a transparent liquid whose viscosity at 25° C. was 0.5 poise.

(B-6): Preparation of a non-aqueous liquid dispersion of polymers 100 parts of mineral spirit were charged in the same reaction vessel as used in Example 1 and was heated at 80° C., while introducing nitrogen therein, and further a mixed solution having the following composition of

| | Parts by weight |
|---|---|
| (A-6) product | 90 |
| Methyl methacrylate | 27.5 |
| Styrene | 27.5 |
| Ethyl acrylate | 36.9 |
| Hydroxyethyl methacrylate | 16.5 |
| Acrylic acid | 1.6 | was dropped thereinto over a period of 2 hours. The contents of the reaction vessel were further kept at 80° C. for 3 hours, thereby obtaining a milky white non-aqueous liquid dispersion which contained 50.5 wt. % of block copolymer and whose viscosity at 25° C. was 5.5 poise.

The liquid dispersion was so stable that after it was allowed to stand for six months, no appreciable precipitation of the particles therein, no appreciable separation thereof into two layers, and no change of viscosity thereof were observed.

The Tg value for the insoluble part of the block copolymer was calculated to be about 43° C. according to Fox's formula.

The obtained liquid dispersion was applied onto a mild steel plate to obtain a dried coating film of 50μ in thickness, followed by further heating at 70° C., whereby the obtained film was very lustrous and smooth.

EXAMPLE 7

(A-7): Preparation of copolymer having peroxy bonds therein

According to the same procedure as described in Example 1, a mixed solution having the following composition of

| | Parts by weight |
|---|---|
| 2-Ethylhexyl methacrylate | 24.5 |
| n-Butyl methacrylate | 10.5 |
| $+C(CH_2)_4\overset{O}{\overset{\|}{C}}O(CH_2)_2O(CH_2)_2O(CH_2)_2O\overset{O}{\overset{\|}{C}}(CH_2)_4COO+_n$ ( n ≈ 5.8) | 2.5 |

| | Parts by weight |
|---|---|
| Ethyl acetate | 50 | was subjected to polymerization at 75° C. for 3 hours. The obtained product (A-7 product) contained 42.5% of copolymer having the peroxy bonds therein. It was a transparent liquid whose viscosity at 25° C. was 1.5 poise.

(B-7): Preparation of a non-aqueous liquid dispersion of polymers

According to the same procedure as described in Example 1, 100 parts of aliphatic hydrocarbons (product of Shell Co., Ltd., trademark Shellsol 71, fraction of b.p. 173° to 195° C.) were heated at 80° C. in a reaction vessel and further a mixed solution having the following composition of

| | Parts by weight |
|---|---|
| (A-7) product | 90 |
| Methyl methacrylate | 22 |
| Ethyl methacrylate | 22 |
| Ethyl acrylate | 48 |
| Hydroxyethyl methacrylate | 16.5 |
| Acrylic acid | 1.5 | was further dropped into the reaction vessel over a period of two hours.

The contents of the reaction vessel were kept at 80° C. for 3 hours, thereby obtaining a milky white nonaqueous liquid dispersion which contained 51.1 wt. % of block copolymers and whose viscosity at 25° C. was 4.0 poise.

The liquid dispersion was so stable that after it was allowed to stand for six months, no appreciable precipitation of the particles therein, no appreciable separation thereof into two layers, and no change of viscosity thereof were observed.

The Tg value for the insoluble part of the block copolymer was calculated to be about 25° C. according to Fox's formula.

The obtained non-aqueous liquid dispersion was applied onto a mild steel plate to obtain a dried coating film of 50μ in thickness, followed by further heating at 70° C., whereby the obtained film was very lustrous and smooth.

EXAMPLE 8

(A-8): Preparation of a copolymer having peroxy bonds therein

According to the same procedure as described in Example 1, a mixed solution having the following composition of

| | Parts by weight |
|---|---|
| Ethylhexyl acrylate | 28 |
| Hydroxyethyl methacrylate | 7 |
| $+C(CH_2)_4CO(CH_2)_4OC(CH_2)_4COO+_n$ (n ≈ 5.5) | 3.0 |
| Butyl acetate | 25 |

| | Parts by weight |
|---|---|
| Isopropyl alcohol | 10 | was subjected to polymerization at 75° C. for 25 hours. The obtained product (A-8 product) contained 51.5 wt. % of the copolymer having peroxy bonds therein. It was a transparent liquid whose viscosity at 25° C. was 4.5 poise.

(B-8): Preparation of non-aqueous liquid dispersion of polymers

In the same reaction vessel as used in Example 1, 125 parts of aliphatic hydrocarbon (Shellsol 71) were heated at 80° C., while introducing nitrogen gas therein, and further a mixed solution of 50 parts of (A-8) product, 40 parts of styrene, 30 parts of n-butyl acrylate, 35 parts of ethyl acrylate and 20 parts of hydroxyethyl methacrylate was added dropwise into the reaction vessel over a period of 2 hours. The contents of the reaction vessel were kept at 80° C. for 3 hours, thereby obtaining a milky white non-aqueous liquid dispersion which contains 51.0 wt. % of block copolymer and whose viscosity at 25° C. was 1.5 poise.

The liquid dispersion was so stable that after it was allowed to stand for six months, no appreciable precipitation of the particles therein, no appreciable separation thereof into two layers and no change of the viscosity thereof were observed.

The Tg value for the insoluble part of the block copolymer was calculated to be about 10° C. according to Fox's formula.

The obtained non-aqueous liquid dispersion was applied onto a mild steel plate to obtain a dried coating film of 50μ in thickness, followed by further heating at 70° C., whereby the obtained film was very lustrous and smooth.

EXAMPLE 9

(A-9): Preparation of copolymer having peroxy bonds therein

According to the same procedure as described in Example 1, a mixed solution having the following composition of

| | Parts by weight |
|---|---|
| Stearyl methacrylate | 35 |
| $+C(CH_2)_4CO(CH_2)_4OC(CH_2)_4COO+_n$ (n ≈ 5.5) | 2.5 |
| Methylethyl ketone | 25 |
| n-Butyl alcohol | 10 | was subjected to polymerization at 75° C. for 3 hours. The obtained product (A-9 product) contained 51.0 wt. % of copolymer having peroxy bonds therein. It was a transparent liquid whose viscosity at 25° C. was 3.0 poise.

(B-9): Preparation of a non-aqueous liquid dispersion of polymers 100 parts of mineral spirit were heated at 80° C. in the same reaction vessel as used in Example 1, while introducing nitrogen gas therein, and further a mixture of 90 parts of (A-9) product, 24 parts of n-butyl methacrylate, 25 parts of ethyl acrylate and 27 parts of glycidyl methacrylate was dropped into the reaction vessel over a period of one hour.

The contents of the reaction vessel were further kept at 80° C. for 4 hours, thereby obtaining a milky white non-aqueous liquid dispersion of polymers which contained 51.4 wt. % of block copolymer and whose viscosity was 5.0 poise at 25° C.

The liquid dispersion was so stable that after it was allowed to stand for six months, no appreciable precipitation of the particles therein, no appreciable separation thereof into two layers and no change of viscosity thereof were observed.

The Tg value for the insoluble part of the block copolymer was calculated to be 35° C. according to Fox's formula.

The obtained non-aqueous liquid dispersion was applied onto a mild steel plate to obtain a dried coating film of 50μ in thickness, followed by further heating at 70° C., whereby the obtained film was very lustrous and smooth.

EXAMPLE 10

(A-10): Preparation of copolymer having peroxy bonds therein

According to the same procedure as that described in Example 1, a mixed solution having the following composition of

| | Parts by weight |
|---|---|
| Lauryl methacrylate | 30 |
| Acrylic acid | 5 |
| $+C-(CH_2)_4-C-OOC-CH_2CH_2-COO+_n$ (with CH₃ groups) | 1.0 |
| (n ≈ 3.5) | |
| 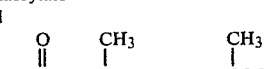 | |
| (n ≈ 3.6) | |
| Ethyl acetate | 25 |
| n-Butyl alcohol | 25 | was heated at 70° C. and was subjected to polymerization for 5 hours. The obtained product (A-10 product) contained 42.5 wt. % of copolymer having peroxy bonds therein and it was a transparent liquid whose viscosity at 25° C. was 2.5 poise.

(B-10): Preparation of non-aqueous liquid dispersion of polymers 115 parts of mineral spirit were heated to 80° C. in the same reaction vessel as used in Example 1, while introducing nitrogen gas therein, and further a mixed solution having the composition of

| | Parts by weight |
|---|---|
| (A-10) product | 40 |
| Methyl methacrylate | 20 |
| Acrylonitrile | 20 |
| n-Butyl acrylate | 40 |
| Ethyl acrylate | 35 |
| Acrylic acid | 10 | was added dropwise to the reaction vessel over a period of 2 hours.

The contents of the reaction vessel were kept at 80° C. for 3 hours, thereby obtaining a milky white non-aqueous liquid dispersion of polymers which contained 51.0 wt. % of block copolymer and whose viscosity was 2.5 poise at 25° C.

The liquid dispersion was so stable that after it was allowed to stand for six months, no appreciable precipitation of the particles therein, no appreciable separation thereof into two layers and no change of viscosity thereof were observed.

The Tg value for the insoluble part of the block copolymer was calculated to be about 1.5° C. according to Fox's formula.

The obtained non-aqueous liquid dispersion was applied onto a mild steel plate to obtain a dried coating film of 50μ in thickness, followed by further heating at 70° C., whereby the obtained film was very lustrous and smooth.

EXAMPLE 11

(A-11): Preparation of copolymer having peroxy bonds therein

According to the same procedure as that described in Example 8, there was produced the same polymer product (A-11 product) having peroxy bonds therein as that obtained in Example 8.

(B-11): Preparation of non-aqueous liquid dispersion of polymers 125 parts of aliphatic hydrocarbon (product of Shell Co., Ltd., trademark Shellsol 71) were charged in the same reaction vessel as used in Example 1 and were heated at 80° C., while introducing nitrogen gas therein, and further a mixed solution of 50 parts of (A-11) product, and 125 parts of ethyl acrylate were added dropwise into the reaction vessel over a period of 3 hours. The contents of the reaction vessel were further kept at 80° C. for 3 hours, thereby obtaining a milky white liquid dispersion of polymers which contained 51.3 wt. % of block copolymer and whose viscosity was 1.2 poise at 25° C.

The liquid dispersion was so stable that after it was allowed to stand for six months, no appreciable precipitation of the particles therein, no appreciable separation thereof into two layers and no change of viscosity thereof were observed.

The Tg value for the insoluble part of the block copolymer was 22° C. according to Table 1.

The obtained non-aqueous liquid dispersion was applied onto a mild steel plate to obtain a dried coating film of 50μ in thickness, followed by further heating at 70° C., whereby the obtained film was very lustrous and smooth.

EXAMPLE 12

(A-12): Preparation of copolymer having peroxy bonds therein

According to the same procedure as that described in Example 8, there was prepared the same polymer (A-12 product) having peroxy bonds therein, as that obtained in Example 8.

(B-12): Preparation of non-aqueous liquid dispersion of polymers 125 parts of petroleum naphtha were heated at 80° C. in the same reaction vessel as used in Example 1, while introducing nitrogen gas, and further a mixed solution of 50 parts of (A-12) product, 18 parts of hydroxyethyl acrylate, 69.5 parts of ethyl acrylate and 37.5 parts of n-butyl acrylate was added dropwise into the reaction vessel over a period of 3 hours. The contents of the reaction vessel were further kept at 80° C. for 3 hours, thereby obtaining a milky white non-aqueous liquid dispersion of polymers which contained 50.6 wt. % of block copolymer and whose viscosity was 6.5 poise at 25° C. The liquid dispersion was so stable that after it was allowed to stand for six months, no appreciable precipitation of particles therein, no appreciable separation thereof into two layers and no change of viscosity were observed. The Tg value for the insoluble part of the block copolymer was calculated to be about −31° C. according to Fox's formula.

The obtained non-aqueous liquid dispersion of polymers was applied onto a mild steel plate to obtain a dried coating film of 50μ in thickness, followed by further heating at 70° C. whereby the obtained film was very lustrous and smooth.

EXAMPLE 13

(A-13) and (B-13): Preparation of copolymer having peroxy bonds therein and Preparation of non-aqueous liquid dispersion of polymers The same procedures as that described in Example 6 were carried out except that

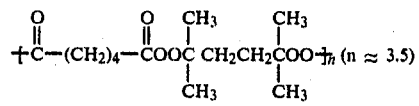

was used in place of

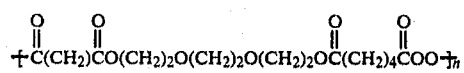

(n ≈ 5.8)
thereby obtaining a milky white non-aqueous liquid dispersion of polymers which contained 50.5 wt. % of block copolymer and whose viscosity was 6.1 poise at 25° C.

The liquid dispersion was so stable that after it was allowed to stand for six months, no appreciable precipitation of the particles therein, no appreciable separation thereof into two layers and no change of the viscosity thereof were observed. The obtained non-aqueous liquid dispersion of polymers was applied onto a mild steel plate to obtain a coating film of 50μ in thickness, followed by further heating at 70° C., whereby the obtained film was very lustrous and smooth.

EXAMPLE 14

(A-14): Preparation of copolymer having peroxy bonds therein

According to the same procedure as described in Example 1, a mixed solution having the following composition of

|  | Parts by weight |
|---|---|
| 2-Ethylhexyl acrylate | 14 |
| n-Butyl acrylate | 14 |
| Hydroxyethyl methacrylate | 7 |
| $+C(CH_2)_4CO(CH_2)_2O(CH_2)_2O(CH_2)_2OC(CH_2)_4COO\}_{\overline{n}}$ (n ≈ 5.8) | 3.0 |
| Butyl acetate | 35 |
| n-Butyl alcohol | 15 | was subjected to polymerization at 75° C. for 2.5 hours.

The obtained product (A-14 product) contained 42.7 wt. % of copolymer having peroxy bonds therein and it was a transparent liquid whose viscosity at 25° C. was 0.3 poise.

(B-14): Preparation of non-aqueous liquid dispersion of polymers 100 parts of mineral spirit were heated at 80° C. in the same reaction vessel as used in Example 1, while introducing nitrogen gas therein, and further a mixed solution having the following composition of

|  | Parts by weight |
|---|---|
| (A-14) product | 90 |
| Methyl methacrylate | 34 |
| Styrene | 35.5 |
| n-Butyl acrylate | 21.5 |
| Hydroxyethyl methacrylate | 17 |
| Acrylic acid | 2 | was dropped into the reaction vessel over a period of 2 hours.

The contents of the reaction vessel were kept at 80° C. for 3 hours, thereby obtaining a milky white nonaqueous liquid dispersion of polymers which contained 50.4 wt. % of block copolymer and whose viscosity at 25° C. was 4.3 poise.

The liquid dispersion was so stable that after it was allowed to stand for six months, no appreciable precipitation of the particles therein, no appreciable separation thereof into two layers and no change of viscosity thereof were observed.

The Tg value for the insoluble part of the block copolymer was calculated to be about 50° C. according to Fox's formula.

The obtained non-aqueous liquid dispersion was applied onto a mild steel plate to obtain a dried coating film of 50μ in thickness, followed by further heating at 70° C., whereby the obtained film was very lustrous and smooth.

EXAMPLE 15

(A-15): Preparation of copolymer having peroxy bonds therein

According to the same procedure as described in Example 1, a mixed solution having the following composition of

| | Parts by weight |
|---|---|
| Hydroxyethyl methacrylate | 17 |
| Acrylic acid | 1.5 |
| Methyl methacrylate | 17.5 |
| Styrene | 14 |
| $+C(CH_2)_4\overset{O}{\overset{\|}{C}}O(CH_2)_2O(CH_2)_2O\overset{O}{\overset{\|}{C}}(CH_2)_4COO\}_{\overline{n}}$ (n ≈ 5.8) | 3.5 |
| Ethyl alcohol | 30 | was subjected to polymerization at 75° C. for 3 hours.

The obtained product (A-15 product) contained 51.0 wt. % of copolymer having peroxy bonds therein and it was a transparent liquid whose viscosity at 25° C. was 6.1 poise.

(B-15): Preparation of non-aqueous liquid dispersion of polymers 125 parts of ethyl alcohol were heated at 80° C. in the reaction vessel, while introducing nitrogen gas therein, and further a mixed solution having the composition of

| | Parts by weight |
|---|---|
| (A-15) product | 50 |
| Acrylonitrile | 20 |
| Styrene | 40 |
| n-Butyl acrylate | 40 |
| Hydroxyethyl methacrylate | 18 |
| Acrylic acid | 2 | was dropped into the reaction vessel over a period of 2 hours.

The contents of the reaction vessel were kept at 80° C. for 3 hours, thereby a milky non-aqueous liquid dispersion of polymers which contained 50.1 wt. % of block copolymer and whose viscosity was 2.5 poise at 25° C. was obtained.

The liquid dispersion was so stable that after it was allowed to stand for six months, no appreciable precipitation of the particles therein, no appreciable separation thereof into two layers and no changes of viscosity thereof were observed.

The Tg value for the insoluble part of the block copolymer was calculated to be 24° C., according to Fox's formula.

The obtained non-aqueous liquid dispersion was applied onto a mild steel plate to obtain a dried coating film of 50μ in thickness, followed by further heating at 70° C., whereby the obtained film was very lustrous and smooth.

EXAMPLE 16

(A-16): Preparation of copolymer having peroxy bonds therein

According to the same procedures as described in Example 1, a mixed solution having the following composition of

| | Parts by weight |
|---|---|
| Hydroxyethyl methacrylate | 25 |
| Acrylic acid | 25 |
| Methyl methacrylate | 12.5 |
| Ethyl acrylate | 10.0 |
| $+C(CH_2)_4\overset{O}{\overset{\|}{C}}O(CH_2)_2O(CH_2)_2O\overset{O}{\overset{\|}{C}}(CH_2)_4COO\}_{\overline{n}}$ (n = 5.8) | 3.5 |
| Isopropyl alcohol | 30 |
| Ethyl cellosolve | 20 | was polymerized at 75° C. for 3 hours.

The resulting product (A-16 product) contained 50.8 wt. % of copolymer having peroxy bonds therein and it was a transparent solution whose viscosity was 7.2 poise at 25° C.

(B-16): Preparation of non-aqueous liquid dispersion of polymers

In the same reaction vessel as used in Example 1, 125 parts of isopropyl alcohol were heated at 80° C., while introducing nitrogen gas therein, and further a mixed solution having the following composition of

| | Parts by weight |
|---|---|
| (A-16) product | 50 |
| Styrene | 40 |
| n-Butyl acrylate | 60 |
| Hydroxyethyl methacrylate | 18 |
| Acrylic acid | 2 | was dropped into the reaction vessel over a period of 2 hours. The contents of the reaction vessel were kept at 80° C. for 3 hours, thereby obtaining a milky white non-aqueous liquid dispersion of polymers which contained 50.4 wt. % of block copolymer and whose viscosity at 25° C. was 4.1 poise.

The liquid dispersion was so stable that after it was allowed to stand for six months, no appreciable precipitation of the particles therein, no appreciable separation thereof into two layers and no change of viscosity thereof were observed.

The Tg for the insoluble part of the block copolymer was calculated to be −1° C., according to Fox's formula.

The obtained non-aqueous liquid dispersion was applied onto a mild steel plate to obtain a dried coating film of 50μ in thickness, followed by further heating at 70° C., whereby the obtained film was very lustrous and smooth.

EXAMPLE 17

(A-17): Preparation of copolymer having peroxy bonds therein

The (A-17) product was prepared by the same procedure as carried out in Example 15.

(B-17): Preparation of non-aqueous liquid dispersion of polymers

In the same reaction vessel as used in Example 1, 125 parts by weight of ethyl alcohol were heated at 80° C., while introducing nitrogen gas therein, and a mixed solution having the following composition of

|  | Parts by weight |
|---|---|
| (A-17) product | 50 |
| Acrylonitrile | 20 |
| Styrene | 20 |
| 2-Ethylhexyl acrylate | 60 |
| Hydroxyethyl methacrylate | 18 |
| Acrylic acid | 2 | was further dropped into it over a period of 2 hours. The contents of the reaction vessel were further kept at 80° C. for 3 hours, thereby obtaining a milky white non-aqueous liquid dispersion of polymers which contained 50.2 wt. % of block copolymer and whose viscosity was 3.2 poise at 25° C.

The liquid dispersion was so stable that after it was allowed to stand for six months, no appreciable precipitation of the particles therein, no appreciable separation thereof into two layers and no change of viscosity thereof were observed.

The Tg value for the insoluble part of the block polymers was calculated to be −25° C. according to Fox's formula.

The obtained non-aqueous liquid dispersion was applied onto a mild steel plate to obtain a dried coating film of 50μ in thickness, followed by further heating at 70° C., whereby the obtained film was very lustrous and smooth.

EXAMPLE 18

(A-18): Preparation of copolymer having peroxy bonds therein

The (A-18) product was the same as the (A-15)product.

(B-18): Preparation of non-aqueous liquid dispersion of polymer

In the same reaction vessel, 100 parts of ethyl alcohol were heated at 80° C., while introducing nitrogen gas therein, and further a mixed solution having the following composition of

|  | Parts by weight |
|---|---|
| (A-18) product | 90 |
| 2-Ethylhexyl acrylate | 110 | was dropped into the reaction vessel over a period of 3 hours. The contents of the reaction vessel were further kept at 80° C. for 3 hours thereby obtaining a milky white non-aqueous liquid dispersion of polymers which contained 50.5 wt. % of block copolymer and whose viscosity at 25° C. was 4.5 poise.

The liquid dispersion was so stable that after it was allowed to stand for six months, no appreciable precipitation of the particles therein, no appreciable separation thereof into two layers and no change of viscosity thereof were observed.

The Tg value for the insoluble part of the block copolymer was −85° C. from Table 1 and was the same as that for the homopolymer of 2-ethylhexyl acrylate.

The obtained non-aqueous liquid dispersion was applied onto a mild steel plate to obtain a dried coating film of 50μ in thickness, followed by further heating at 70° C., whereby the obtained film was very lustrous and smooth.

EXAMPLE 19

(A-19): Preparation of copolymer having peroxy bonds therein

The (A-19) product was identical to the (A-16) product.

(B-19): Preparation of non-aqueous liquid dispersion of polymers

In the same reaction vessel as used in Example 1, 125 parts by weight of isopropyl alcohol were heated at 80° C., while introducing nitrogen gas therein, and a mixed solution having the following composition of

|  | Parts by weight |
|---|---|
| (A-19) product | 50 |
| Acrylonitrile | 20 |
| Styrene | 50 |
| n-Butyl acrylate | 19 |
| n-Butyl methacrylate | 11 |
| Hydroxyethyl methacrylate | 18 |
| Acrylic acid | 2 | was dropped thereinto over a period of 2 hours.

The contents of the reaction vessel were further kept at 80° C. for 3 hours, thereby obtaining a milky white non-aqueous liquid dispersion which contained 50.4 wt. % of block copolymer and whose viscosity was 1.8 poise at 25° C.

The liquid dispersion was so stable that after it was allowed to stand for six months, no appreciable precipitation of the particles therein, no appreciable separation thereof into two layers and no change of viscosity thereof were observed.

The Tg value for the insoluble part of the block copolymer was calculated to be 50° C. according to Fox's formula.

The obtained non-aqueous liquid dispersion was applied onto a mild steel plate to obtain a dried coating film of 50μ in thickness, followed by further heating at 70° C., whereby the obtained film was very lustrous and smooth.

Comparative Example 1

A non-aqueous liquid dispersion of polymers consisting of soft insoluble polymers was prepared by the known method for producing the same.

(CA-1): Preparation of soluble polymer

In the same vessel as used in Example 1, a mixed solution having the following composition of

|  | Parts by weight |
|---|---|
| 2-Ethylhexyl acrylate | 28 |
| Hydroxyethyl methacrylate | 7 |
| Azobisisobutyronitrile | 1.2 |
| Butyl acetate | 25 |
| n-Butyl alcohol | 10 | was heated at 75° C., followed by polymerization at that temperature for 2.5 hours.

The obtained product (CA-1 product) contained 51.0 wt. % of copolymer and it was a transparent liquid whose viscosity was 3.0 poise at 25° C.

(CB-1): Preparation of non-aqueous liquid dispersion of polymers

In the same reaction vessel as used in Example 1, a mixed solution having the following composition of

|  | Parts by weight |
|---|---|
| Aliphatic hydrocarbon (Shellsol 71) | 125 |
| (CA-1) product | 50 |
| tert Butylperoxyoctoate | 0.3 | was heated at 80° C., while introducing nitrogen gas therein, followed by adding dropwise a mixed solution having the following composition of

|  | Parts by weight |
|---|---|
| Styrene | 40 |
| Ethyl acrylate | 35 |
| n-Butyl acrylate | 30 |
| Hydroxyethyl methacrylate | 20 |
| tert-Butylperoxyoctoate | 1.5 | into the reaction vessel over a period of 2 hours.

When the contents of the reaction vessel were kept at 80° C., lumps or aggregates of polymer were precipitated as time passed and eventually continuation of the reaction becamea impossible.

The Tg value for the insoluble polymer was calculated to be about 8° C. according to Fox's formula, but these polymers were not actually obtained.

Comparative Example 2

A non-aqueous liquid dispersion of polymers consisting of hard insoluble polymers was prepared by the known method for producing the same.

(CA-2): Preparation of soluble polymers

A soluble polymer product (CA-2) was prepared by the same procedure as carried out in Comparative Example 1.

(CB-2): Preparation of non-aqueous liquid dispersion of polymers

In the same reaction vessel as used in Example 1, a mixture of 125 parts of aliphatic hydrocarbon (Shellsol 71), 50 parts of (CA-2) product and 0.3 part of tert-butylperoxyoctoate was heated at 80° C. while introducing nitrogen gas therein, followed by adding dropwise a mixed solution having the following composition of

|  |  |
|---|---|
| Acrylonitrile | 25 |
| Styrene | 25 |
| Methyl methacrylate | 27 |
| n-Butyl methacrylate | 26 |
| Hydroxyethyl methacrylate | 20 |
| Acrylic acid | 2 |
| tert Butyl peroxyoctoate | 1.5 | into the reaction vessel over a period of 2 hours.

The contents of the reaction vessel were kept at 80° C. for 3 hours, thereby obtaining a milky white non-aqueous liquid dispersion of polymers which contained 51.5 wt. % of graft copolymers consisting of soluble parts and insoluble parts and whose viscosity at 25° C. was 4.2 poise.

No changes were observed in this liquid dispersion after it was allowed to stand at 25° C. for a week, but precipitation of the polymer particles was observed after it was allowed to stand for a month.

In this case, the Tg value for the insoluble part of the graft polymers was calculated to be about 74° C., according to Fox's formula.

Performance tests of thermosetting, polymer film-forming, coating compositions using non-aqueous liquid dispersions of polymers as a film former were carried out and the obtained results were as follows:

Test 1

The dispersion stability of the non-aqueous liquid dispersion of polymers was tested when it was diluted with a paint thinner. Concerning the non-aqueous liquid dispersions of polymers of Examples 6-10, Examples 12-14 and Comparative Example 2, the respective liquid dispersions were tested as regards the dispersion stability thereof by diluting two parts by weight thereof with a paint thinner which consisted of one part by weight of Shellsol 71 (product of Shell Co., Ltd.) and one part by weight of butylcellosolve.

Concerning the products of Examples 15-17 and Example 19, the respective liquid dispersions were tested as regards the dispersion stability thereof by diluting two parts by weight of the same with a paint thinner which consisted of one part by weight of ethyl alcohol and one part by weight of ethylcellosolve.

The results obtained are shown in Table 2.

TABLE 2

| Number of days after dilution | Liquid Dispersion of | | | | | | | |
|---|---|---|---|---|---|---|---|---|
| | Example 6 | Example 7 | Example 8 | Example 9 | Example 10 | Example 11 | Example 12 | Example 13 |
| 0 | O | O | O | O | O | O | O | O |
| 10 | O | O | O | O | O | O | O | O |
| 20 | O | O | O | O | O | O | O | O |
| 30 | O | O | O | O | O | O | O | O |
| Number of days after dilution | Liquid Dispersion of | | | | | | | |
| | Example 14 | Example 15 | Example 16 | Example 17 | Example 18 | Example 19 | Comparative Example 2 | |
| 0 | O | O | O | O | O | O | O | |
| 10 | O | O | O | O | O | O | x | |
| 20 | O | O | O | O | O | O | x | |

TABLE 2-continued

| 30 | O | O | O | O | O | O | x |

Note:
Evaluation criteria in Table 2
O : The dispersion stability is excellent and no abnormal phenomenons occur
x : The polymers in the dispersed solution precipitate in the form of a gel

Test 2

Tests for the coating performance of a non-aqueous liquid dispersion as a thermosetting, polymer, film-forming, coating composition were carried out.

The respective non-aqueous liquid dispersions of polymers were mixed with a curing agent as shown in Table 3, followed by diluting the same with the following diluent, so as to make the content of the solid polymer therein to be 40 wt. %.

For the liquid dispersion of Examples 6–10, Examples 12–14 and Comparative Example 2, as the diluent, a paint thinner consisting of one part by weight of an aliphatic hydrocarbon (Trademark Shellsol 71, product of Shell Co., Ltd.) and one part by weight of butylcellosolve was used. For the liquid dispersions of Examples 15–17, and Example 19, a paint thinner consisting of one part by weight of ethyl alcohol and one part by weight of ethylcellosolve was used.

The respective resulting products were applied onto a mild steel plate to obtain a dried coating film of 50μ in thickness, followed by baking the same at 160° C. for 20 minutes.

The physical properties of the respective obtained films were tested and the results obtained are shown in Table 3.

peroxides selected from the group consisting of compounds having the formulas (I) and (II), $$+CR_1 COR_2 OCR_1 COO+_n \quad (I)$$

with carbonyl groups (O=C) on each CR_1 and OCR_1, $$+CR_1 COOC(CH_3)CH_2CH_2C(CH_3)COO+_n \quad (II)$$

wherein $R_1$ is alkylene having 1 to 18 carbon atoms or phenylene, $R_2$ is (1) alkylene having 2 to 10 carbon atoms, $$-(CH(R_3) CH_2 O)_m - R_4 - , \quad (2)$$

wherein $R_3$ is hydrogen or methyl, $R_4$ is alkylene having 2 to 10 carbon atoms, m is an integer of 1 to 13, $$-\phi-C(CH_3)_2-\phi- \text{ or} \quad (3)$$

$$-\text{cyclohexyl}-C(CH_3)_2-\text{cyclohexyl}- \quad (4)$$

TABLE 3

| | Liquid Dispersion | | | | | | | | | | | | Comparative Example 12 |
|---|---|---|---|---|---|---|---|---|---|---|---|---|---|
| | Example | | | | | | | | | | | | |
| | 6 | 7 | 8 | 9 | 10 | 12 | 13 | 14 | 15 | 16 | 17 | 19 | |
| Curing agent used (Note 1) | A | A | A | B | C | A | A | A | A | A | A | A | A |
| Pencil hardness of film | 3H | 2H | 2-3H | 4H | 2H | H-2H | 3H | 4H | 3H | 2H-3H | 2H | 4H | 3H |
| Bending (180°) (Note 2) | O | O | O | O | O | O | O | O | O | O | O | O | many cracks |
| Checker board exfoliation test (Note 3) | 100/100 | 100/100 | 100/100 | 100/100 | 100/100 | 100/100 | 100/100 | 100/100 | 100/100 | 100/100 | 100/100 | 100/100 | a lot of exfoliation |
| Solvent resistance (Note 4) | O | O | O | O | O | O | O | O | O | O | O | O | slight trace |
| Transparency (Note 5) | O | O | O | O | O | O | O | O | O | O | O | O | x |

Note 1.
Curing Agent
A: Melamine - formaldehyde resin (Product: Dainippon Ink Co., Ltd. trademark; Super Peckermine L - 105 - 60)
B: 50 wt. % xylene solution of random copolymer consisting of styrene, methyl methacrylate, n-butyl acrylate and acrylic acid
C: 50 wt. % xylene solution of random copolymer consisting of styrene, methyl methacrylate, n-butyl acrylate and glycidyl methacrylate
Note 2.
O mark in the bending test shows that no crack nor exfoliation occurred in the test piece
Note 3.
In the checker-board exfoliation test, the denominator is the number of squares cut on the surface of the test piece and the numerator is the number of unexfoliated squares of the coated film on the test piece after the test.
Note 4.
O mark in the solvent resistance test shows that no signs of dissolving of the film were seen in the test piece.
Note 5.
O mark in the transparency test shows that the transparency is excellent and x mark shows that the transparency is bad.

The embodiments of the invention in which an exclusive property or privilege is claimed are defined as follows:

1. A method for producing a non-aqueous liquid dispersion of polymers, which comprises: in a first copolymerization step, copolymerizing one or more polymeric and n is from 2 to 20, with one or more vinyl-type monomers, thereby obtaining copolymers having peroxy bonds therein; then, in a second copolymerization step, subjecting said copolymers having peroxy bonds therein to block copolymerization with one or more vinyl-type monomers which are different in composition from the vinyl-type monomer used in the first copolymerization step, in the presence of an organic liquid which dissolves said copolymers of the vinyl-type monomers obtained in the first copolymerization step but does not dissolve polymers of the vinyl-type monomer used in the second copolymerization step.

2. A method as claimed in claim 1, wherein the vinyl-type monomer used in the second copolymerization step has a glass transition temperature of from 50° C. to −85° C.

3. A method as claimed in claim 1 in which the amount of said polymeric peroxide used in said first copolymerization step is from 0.5 to 10 parts by weight, per 100 parts by weight of said vinyl-type monomer used in said first copolymerization step.

4. A method as claimed in claim 3 in which the amount of said organic liquid is from 30 to 70% by weight, based on the total weight of said non-aqueous liquid dispersion of polymers.

* * * * *